*INVENTOR.*

FREDERICK L. POST

*BY* John C. Dougherty Jr

AGENT 2,898,581

MULTIPATH MAGNETIC CORE MEMORY DEVICES

Frederick L. Post, Poughkeepsie, N.Y., assignor to International Business Machines Corporation, New York, N.Y., a corporation of New York Application November 19, 1956, Serial No. 623,174

20 Claims. (Cl. 340—174)

This invention relates to magnetic memory devices and more particularly to improvements in such devices which render them particularly adaptable for use in high speed and/or nondestructive interrogation memory systems of the coordinate array type.

It is usual, in memory systems employed commercially, to arrange the individual memory elements in the form of an array which is addressed by applying signals to coordinate column and row drive lines. Any memory element in such an array may be selectively addressed for reading or writing by coincidently pulsing both the coordinate row drive line and the coordinate column drive line with which it is associated. Many such arrays utilizing magnetic cores as storage elements have been established in the art. In meeting the stringent requirements made of memory by high speed computing devices, various magnetic elements having characteristics particularly adaptable to efficient use in high speed arrays have been developed. One such element is described in the copending application Serial No. 546,180 filed November 10, 1955, and another in copending application 564,530 filed February 9, 1956, both of which applications have been assigned to the assignee of the present application. Both these applications are by this reference thereto incorporated herein as part of this disclosure. The elements described in each of these applications have come to be termed multipath cores and in operation flux changes are selectively accomplished in different ones of the flux paths encompassed within the cores.

One advantage which may be realized with cores of this nature is their adaptability to operation at exceedingly high speeds in coordinate array systems wherein it is required that the prescribed flux reversals be experienced in certain of the flux paths of a particular core only when both of the coordinate drive windings associated with that core are coincidently energized. Core structures having this advantage are shown and described in the above-mentioned application Serial No. 546,180. A further advantage evidenced by the core structures of this application lies in the fact that the half select current pulses applied to the coordinate drive windings are not limited in magnitude by a threshhold value as is the case in previous array systems. Another advantage which may be realized with cores of this nature is that only a small back electromotive force is developed by windings on nonselected cores when a core in the same column or row is selected during a reading or writing operation. A core structure embodying this advantage is shown in the aforementioned application Serial No. 564,530. This application also discloses the manner in which, utilizing such a core, nondestructive interrogation may be realized.

A primary object of the present invention is to provide an improved multipath magnetic core element having a novel arrangement of drive and sense windings.

A further object is to provide a multipath magnetic core element which is capable of being operated at exceedingly high speeds in large coordinate arrays without there being the need of either supplying to the coordinate drive lines power of the magnitude heretofore required by high speed arrays of this type, or of accurately controlling, within small limits, the magnetizing force applied by a half select pulse to any core in the array.

A further object is to provide an improved core storage element having a novel arrangement of windings which, in accordance with a novel mode of operation, is capable of being interrogated in a nondestructive manner.

One form of the improved device, particularly adapted for high speed operation, comprises a multipath core structure wherein information is written and then read out by applying magnetomotive forces to selected ones of the flux paths to thereby cause changes in flux in a localized portion of the core material which is linked by a sense winding. In this embodiment, one portion of the core is divided into two major parallel flux paths of equal cross section and each of these flux paths is subdivided into two minor parallel flux paths which are also of equal cross section. The core is provided with a read winding which embraces only one of the minor flux paths and a write winding which embraces another one of the minor flux paths. Each of these windings, when energized, applies unidirectional magnetomotive force to the embraced path and, since each winding embraces only one flux path, these paths may be normally subjected to a biasing magnetomotive force which helps to control the shifting of flux in the localized paths during the reading and writing operations. A further advantage realized is that, because of the presence of the bias winding, coordinate read and write windings may be utilized and driven by currents greatly exceeding the limit normally established by the threshold of the magnetic material. Since currents greater than those normally allowable in half select coincident current systems may be utilized, the speed of switching may be greatly increased, and this advantage is gained without the necessity of switching flux in any portion of the core when only one of the drive windings is energized. As a result high speeds are attainable in large arrays of cores of this type without the necessity of providing a large amount of power to switch localized flux paths in nonselected cores in selected rows and columns.

In another embodiment, the multipath core structure is shown with the windings necessary to render it capable of being interrogated nondestructively. In this embodiment information is written in the core by energizing write winding means effective to establish a remanent condition in one or the other of two opposite directions in the main flux paths of the core. The core is then conditioned for interrogation. Interrogation, itself, is a two step operation, the core first being set up by pulsing a setup winding means which embraces one of the minor flux paths and then read out by pulsing a read winding means which embraces another of the minor flux paths. The setting up and reading out of the information in the core involve only localized flux changes, the overall direction of the main flux remaining the same. As a result, the core may be interrogated repeatedly without destroying the information stored thereon.

There is also shown an array of cores capable of nondestructive interrogation. Each of the cores in the array is provided with row and column coordinate write windings and with row and column coordinate setup windings. The selection of a particular core in the array to be interrogated is accomplished by coincidently energizing the proper row and column setup drive lines. The read windings on each core in the array may be connected to a common signal source since the application of a read pulse will cause only a previously set up core to be interrogated.

Thus another object of the invention is to provide improved high speed and nondestructive multipath magnetic storage elements wherein the various drive windings need embrace only one of the core flux paths, thereby greatly simplifying the problem of assembly of high speed and nondestructive core arrays.

A further object is to provide core elements of this type which may be driven by half select pulses applied to each of two drive windings, and wherein the application of a half select pulse to one drive windings alone does not cause a flux reversal in the core so that the pulsed winding then presents a relatively low impedance to the pulse supplied by the coordinate drive line.

Another object is to provide a magnetic memory element wherein binary information values are represented by different patterns of flux distribution in localized flux paths in the element, and wherein bias magnetizing forces applied to certain of these flux paths aids in the shifting of flux from one of the flux paths to the other and also renders the core adaptable for use in coordinate high speed memory arrays.

A further object is to provide a magnetic memory element having one portion thereof divided into four parallel flux paths wherein information is stored and the element interrogated by selectively shifting flux from between the different paths.

A further object is to provide a coordinate memory array employing a storage element capable of being repeatedly interrogated nondestructively wherein each interrogation cycle involves only two operations.

A further object involves to provide such an array wherein the core to be interrogated is selected by the selective energization of two coordinate drive lines and the actual readout is accomplished by the subsequent energization of a single read drive line.

These and other objects of the invention will be pointed out in the following description and claims and illustrated in the accompanying drawings, which disclose, by way of example, the principle of invention and the best mode, which has been contemplated, of applying that principle In the drawings:

Figure 1:
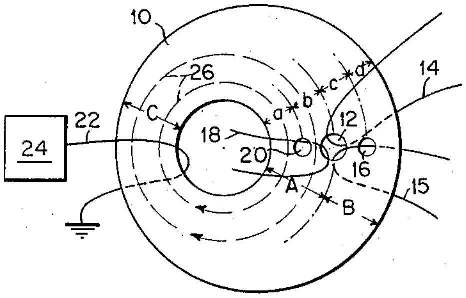
Figs. 1 and 2 are diagrammatic representations of different forms of the core structure utilized in the present invention together with certain of the windings which render the core capable of high speed memory operation.
Figure 2:
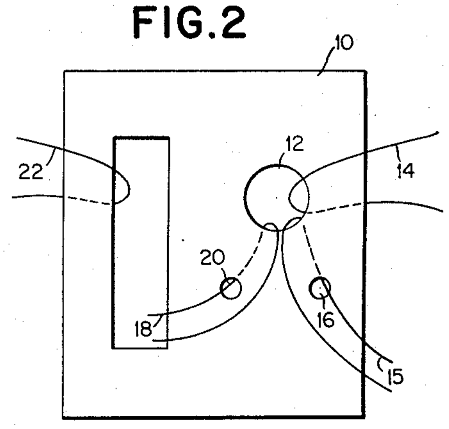

The basic form of the magnetic storage element may be toroidal as shown in Fig. 1, or rectangular as shown in Fig. 2 or may be of other configurations. Equivalent apertures and windings shown in Figures 1 and 2 are given similar designations, the description about to be given of Fig. 1 sufficing to explain the structure of both figures. Core 10 of Fig. 1 has positioned therethrough an opening 12 which divides the right hand portion of the core into two sections or flux paths designated A and B. The cross sectional area of the magnetic material in each of these flux paths may be equal to or slightly greater than that of the left-hand portion of the core which is designated C. Paths A and B are each further subdivided by a pair of openings 16 and 20 into substantially equal parallel flux paths, designated *a*, *b*, *c*, and *d*. The core 10 is provided with a first winding 14 which is positioned through opening 12 to embrace flux path B. A second winding 15 is positioned through opening 16 to embrace flux path *c*. A third winding 18 is positioned through opening 20 to embrace flux path *b* and a further winding 22 is provided which embraces the magnetic material in section C. The winding 22 is utilized only once to initially establish a condition of unidirectional flux remanence in the core, after which windings 14, 15, and 18, which are sense, write and read windings, respectively, are utilized to accomplish the operations necessary to the storing and reading out of binary information. Winding 22 is initially energized by a signal source 24 thereby causing a clockwise magnetomotive force to be applied to the core. When the signal applied to winding 22 is terminated the core assumes a remanent state with the flux orientated in the clockwise direction. Since the cross sectional area of section C is approximately equal to or less than that of A and B, the flux orientation established is as indicated by the flux direction lines designated 26; the remanent clockwise condition established being primarily confined, in the right-hand section of the core, to the shorter flux path A. After winding 22 is energized to establish this condition, it is no longer employed. In the above described operation, the smaller cross section of the portion C, which is embraced by winding 22, serves to quantify the amount of flux orientation which is accomplished in the other portion of the core including paths A and B when this winding is energized. However, such a geometry is not a necessity since the amount of flux reversal achieved may be also quantified in other ways, for example, by quantifying the energizing signal applied to the core, in which case the core may have a uniform cross section throughout. For a more detailed discussion of this type of quantification, reference may be made to copending application Serial No. 613,952, filed on October 4, 1956, and assigned to the assignee of this application.

Figure 3:
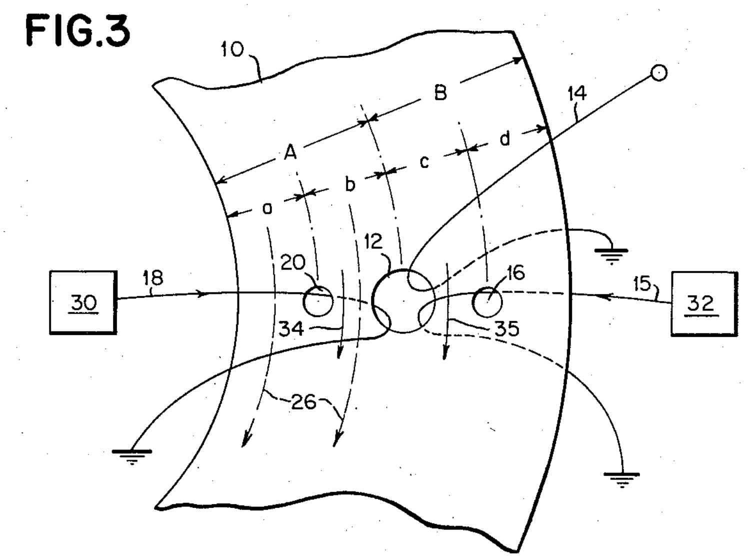
Figs. 3, 3A, 3B, 3C, 3D, 3E and 3F are diagrammatic representations of a portion of the structure of Fig. 1 which depict the various flux patterns established during the operation of the core.

Fig. 3 shows, in somewhat enlarged form, the right-hand portion of the core 10, together with the sense, read and write windings which embraces flux paths in this portion of the core. The initial condition of flux remanence established by energizing winding 22 is indicated by the dotted flux lines 26 in flux paths *a* and *b*. Read winding 18 is connected to a signal source 30 and write winding 15 is connected to a signal source 32. After the initial remanent condition is established, each of the signal sources is controlled to normally maintain a bias current flowing in the winding to which it is connected. The direction of bias current flow is indicated by the arrows on windings 18 and 15. When the bias currents are initially established, winding 18 applies to the embraced path *b* a downward magnetomotive force as is indicated by the arrow 34. Since this applied force is in the same direction as the initial remanent orientation in flux path *b*, there is no flux reversal effected; the bias current merely serving to maintain this portion of magnetic material in a saturated condition in the direction of arrow 34. However, when the bias current is established in winding 15, in which no flux orientation has been previously accomplished, the magnetomotive force applied in the direction of arrow 35 causes the flux in a localized area around opening 16 to be driven to a saturation condition in a counterclockwise direction as is indicated by the flux representing line 36 in Fig. 3A.

Figure 4:
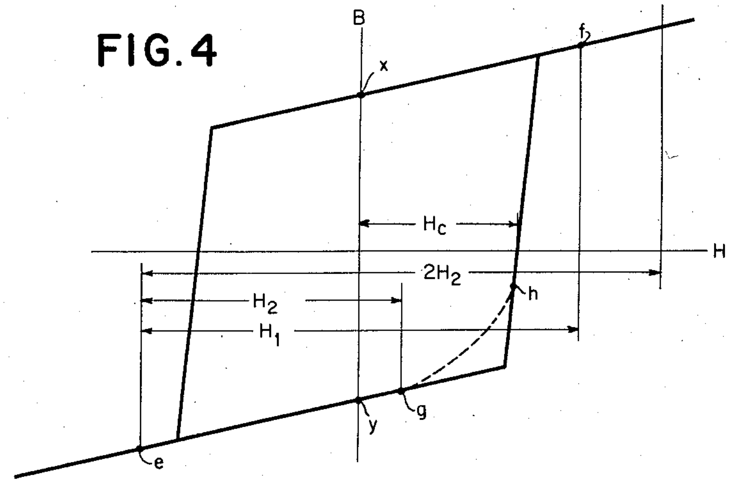
Fig. 4 is a diagrammatic representation of a hysteresis loop for a magnetic material such as might be utilized in practicing the invention.
Figure 3A:
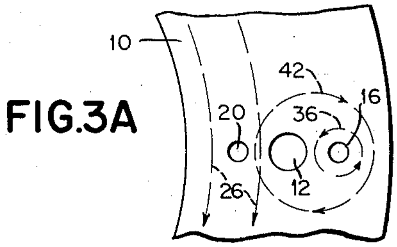

Flux lines 26 and 36 in Fig. 3A represent the initial condition of the core material including the flux paths embraced by the read, write and sense windings before functional circuit operation is begun. There is shown in Fig. 4 a hysteresis loop such as is obtainable by plotting magnetic flux density B versus magnetic field intensity H for a magnetic material such as might be utilized in the core 10. The opposite conditions of remanent flux density are represented in Fig. 4 at *x* and *y* and the initial saturation condition of path *b* between openings 20 and 12 and path *c* between openings 12 and 16 is represented at *e*.

Figure 3B:
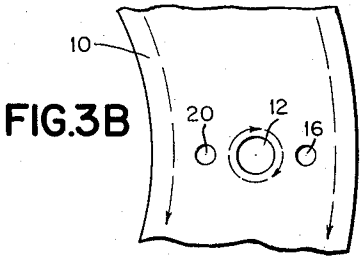

The initial step in the operation of the circuit is to establish a datum condition in the core material adjacent the openings. This is accomplished by applying a pulse to winding 18 effective to cause current flow in the direction opposite to that of the bias current flow in this winding. The magnitude of the pulse is sufficient to cause to be applied to path *b* a magnetomotive force equal in magnitude but opposite in direction to that applied as a result of the flow of bias current through the winding. The change in the intensity of the magnetic field applied to path *b*, when winding 18 is thus pulsed, is depicted in Fig. 4 by an arrow designated $H_1$. The field applied to path *b* is in an upward direction and therefore tends to reverse the flux in this path. Since flux in paths *a* and *c* is also oriented downward, and the flux orientation is upward only in path *d*, the magnitude of the applied magnetomotive force must be sufficient to switch the flux in a circular path extending around both openings 12 and 16 as is depicted by the arrow 42. When such a field is applied, by applying a signal of sufficient magnitude to winding 18, the resulting flux distribution is as shown in Fig. 3B; a condition of flux saturation in the clockwise direction being established around opening 12; the remanent flux condition remaining essentially the same in path *b*; and the flux in the main path from section C (see Fig. 1), which previously extended through path *b*, now being shifted to outer path *d* due to the increase of the reluctance to the remanent flux in path *b* caused by the establishing of the localized condition of saturation around opening 12.

Figure 3C:
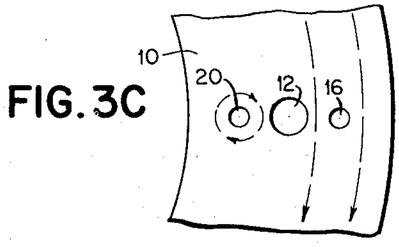

When the input signal to winding 18 terminated, the bias current on that winding again takes effect, causing a downward magnetomotive force to be again applied to path *b* between holes 12 and 20. This applied magnetomotive force is on the proper direction to cause a flux reversal on both sides of opening 20 thereby causing a localized condition of flux saturation in a clockwise direction to be established around this opening thereby increasing the reluctance of path *a* and forcing the main flux from path *a* to path *c* as is shown in Fig. 3C. The flux distribution shown in this figure represents a datum condition, which in operation may be designated the zero representing condition.

Figure 3D:
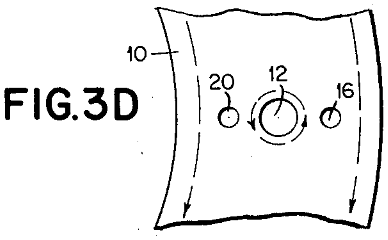

Once this datum condition is established, a zero may be written in the core by again pulsing winding 18 or by failing to pulse any winding. The application of a pulse to winding 18 with the flux in the core material distributed as shown in Fig. 3A merely causes a flux reversal in the circular path around opening 20 so that when the pulse is applied the flux distribution is as shown in Fig. 3F. Upon termination of the input pulse the bias again takes effect and the core again assumes the flux condition shown in Fig. 3C.

When it is desired to write a binary one, a pulse is applied to winding 15 to overcome the bias and cause current flow in the direction opposite to that indicated by the arrow on this winding. The operation is similar to that described above with respect to the change in flux distribution when winding 18 is pulsed with the core in the condition shown in Fig. 3A. The pulse applied to winding 15 is sufficient to cause a change in the intensity of the magnetic field applied to path *c* such as is indicated at $H_1$ in Fig. 4. As a result, as is shown in Fig. 3D, a localized clockwise condition of flux saturation is established in the material around opening 12 and a portion of the main flux is shifted from path *c* to path *a*. When the signal on winding 15 is terminated, the bias again takes effect causing a downward magnetomotive force to be applied to path *c*. Since the direction of the main flux then in path *d* is also downward, the magnetomotive force applied, as the bias current is re-established in winding 15, causes a condition of flux saturation to be established around opening 16 and the main flux in path *d* to be shifted back to path *b*. The resulting flux distribution is shown in Fig. 3E and this condition of flux distribution is designated the binary one representing condition.

The state of the core may be interrogated by pulsing winding 18 in the manner described above. The output signals are developed on sense winding 14, which, as shown in Fig. 3, embraces all of section B and is therefore responsive to flux changes in paths *c* and *d*. When a binary zero has been stored in the core and it has thus been caused to assume the condition of flux distribution shown in Fig. 3C, the application of a signal to read winding 18 causes only a localized flux reversal around opening 20, the change in flux distribution being from that of Figure 3C to that of Fig. 3F, and thus no output is induced on sense winding 14. Upon termination of the read pulse on winding 18, the bias current again takes effect and the core again assumes the zero representing condition of Fig. 3C.

Figure 3E:
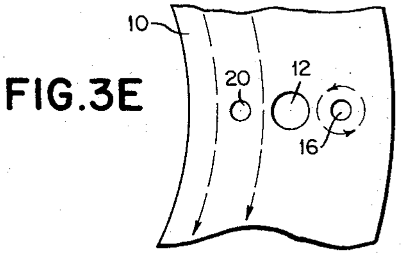
Figure 3F:
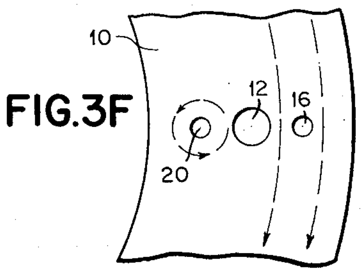

When, after the core has been caused to assume the binary one condition of Fig. 3E, a read pulse is applied to winding 18, the flux distribution changes from that of Fig. 3E to that of Fig. 3B. This involves a reversal of the flux in the magnetic material in path *d* which is embraced by sense winding 14 and an output signal is then induced in the sense winding. Upon termination of the read pulse the bias current on winding 18 takes effect and the core assumes the zero or datum representing state of Fig. 3C. The readout operation is thus destructive in that it destroys the information stored in the core.

It should be noted that the bias applied to paths *b* and *c* may be supplied by separate bias windings embracing these paths in which case the windings 18 and 15 are energized only during reading and writing operations. Where separate bias windings are utilized, which as above normally maintain paths *b* and *c* at the saturation condition *e* of Fig. 4, the magnitude of a signal individually applied to either of the windings 18 and 15 must, of itself, be sufficient to render the connected winding effective to overcome the bias magnetic field intensity and apply a field greater than the coercive field shown at $H_c$ in Fig. 4, to the embraced path.

Figure 5:
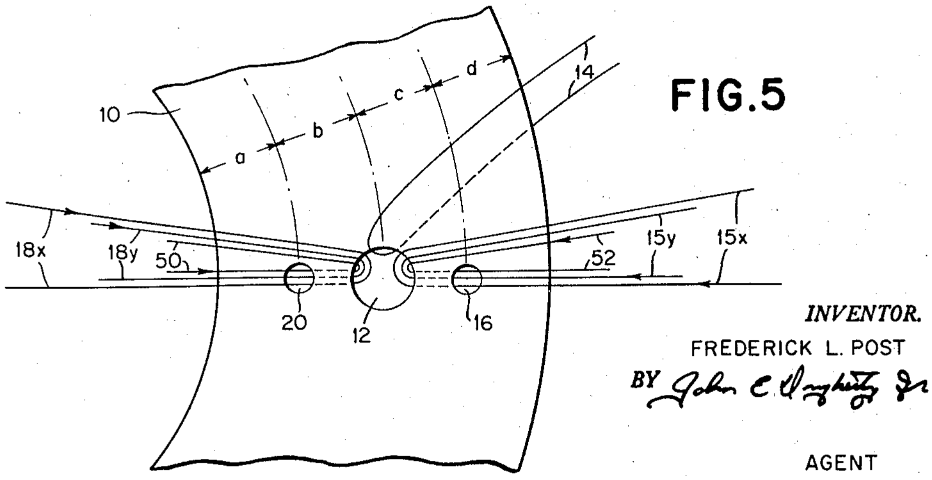
Fig. 5 is a diagrammatic representation of a portion of a magnetic core element, such as is shown in Fig. 1, and indicates one method of positioning windings through the various apertures to render the core adaptable for use in a coordinate memory array.

Fig. 5 shows the manner in which separate bias windings might be wound and also illustrates the manner in which coincident current reading and writing may be achieved. In the construction of Fig. 5, the bias magnetomotive is applied to paths *b* and *c* by windings 50 and 52, respectively. Current is caused to continuously flow in these windings in the direction shown so that paths *b* and *c* are normally subjected to a magnetomotive force in the downward direction and the magnetic material in these paths between opening 20 and 12, and between 12 and 16 is normally in the saturation condition represented at *e* in Fig. 4. Read pulses are applied by the coordinate read windings **18*x* and 18*y* and write pulses by the coordinate write windings 15*x* and 15*y*. Outputs are developed as before in sense winding 14**.

The signals applied to the coordinate read and write windings are sufficient to apply a magnetic field, in intensity equal to $H_2$ shown in Fig. 4, to the embraced path. As is indicated in Fig. 4 the application of a signal to any one of these windings alone is not sufficient, in the presence of the bias field, to cause the coercive field $H_c$ to be exceeded. Thus the application of a signal to either read winding alone or to either write winding alone is ineffective to cause a flux reversal and causes a flux change, in the embraced path, represented by the segment e.g., which flux change, due to the flatness of this portion of the loop, is relatively small. Upon termination of such a signal the embraced path reassumes the biased saturation condition at *e*. The flux distribution is thus unchanged by the application of a signal to either of the coordinate read or write windings alone. However, where both read windings 18*x* and 18*y* are pulsed coincidently, or where both write windings are pulsed coincidently, the total intensity of the magnetic field thereby applied is as shown at $2H_2$ in Fig. 4. The application of such a field overcomes the bias and causes the coercive field $H_c$ to be exceeded so that changes in flux distribution are accomplished in the same manner as described with reference to Figs. 3, 3A, 3B, 3C, 3D, 3E and 3F, wherein windings 18 and 15 are utilized to accomplish reading and writing.

In both of the embodiments of Fig. 3 and Fig. 5, it is possible to employ cores of a magnetic material which does not necessarily exhibit a square type hysteresis loop, as indicated by dotted representation *gh* of Fig. 4, as long as the ratio of flux density at remanence to that at saturation is relatively high. Further, since as explained above, with reference to Fig. 5, the application of a signal to either of the coordinate read or write windings alone does not involve a flux reversal in any part of the core and thus the back electromotive force developed by these windings is relatively small during half select operation. For this reason, it is possible to drive coordinate read and write windings, in a coordinate array of cores constructed as shown in Fig. 5, with a relatively small amount of power. Further, since it is possible to employ biasing fields with the core construction of Fig. 5 extremely high speeds may be achieved in coordinate array systems using cores of this type. It is only necessary that the intensity of the biasing field and the intensity of the field applied by each coordinate drive line individually be so related that coincident energization of both drive lines are required to cause a flux reversal. Regardless of the magnitude of the fields employed, and the speed thus achieved, there is no flux reversal in the core unless both drive lines are coincidently energized, and thus power requirements remain relatively low. At the same time regardless of the magnitude of the fields employed and speed achieved, there is little or no flux change experienced in the portion of the core material embraced by the sense winding when a binary zero is read out and the signal to noise ratio remains exceedingly high.

Figure 6:
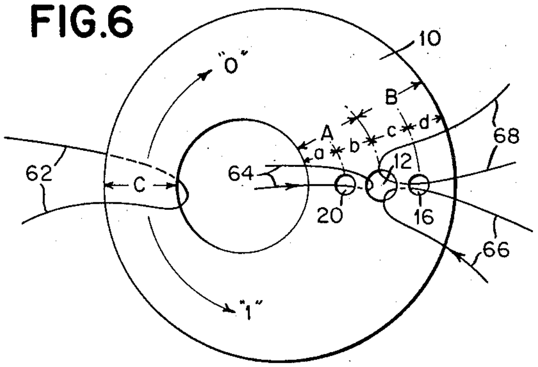
Fig. 6 is a diagrammatic showing of a memory core structure together with the windings necessary to store information in the core and interrogate the core nondestructively.

Fig. 6 shows a further embodiment of the invention which utilizes a core 10 having the same configuration as that of the previously described embodiment and the core and apertures therein are identified by the same reference characters. The core of this embodiment is shown to be provided with four windings designated 62, 64, 66 and 68 so adapted that the structure is capable of storing binary information and of being interrogated in a nondestructive manner. Winding 62 embraces section C of the core 10 and is a drive winding which is employed to write information in the core. A binary one is written in the core by pulsing winding 62 with a signal of a polarity and magnitude effective to establish a remanent flux condition in the counterclockwise condition in the principal flux path around the core. As before, this remanent condition is, in the main, confined to the inner section A of the right hand portion of the core 10. A binary zero is written in the core by pulsing winding 62 with a pulse of opposite polarity to establish a remanent condition of flux density in the clockwise direction.

Winding 64 is threaded through openings 12 and 20 to embrace flux path *b* and is termed a setup winding which, when energized, conditions the core for nondestructive interrogation. Winding 66, which is the read winding and is positioned through openings 12 and 16 to embrace flux path *c*, is then energized to cause an output indicative of the state of the core to be manifested on sense winding 68 which, as shown, is also positioned to embrace the magnetic material in flux path *c* between openings 12 and 16.

Figure 7A:
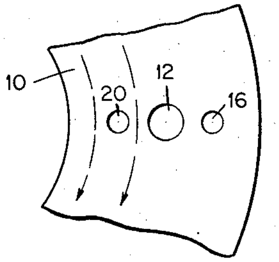
Figs. 7A, 7B, 7C, 7D, 7E and 7F are diagrammatic representations of different flux patterns established in a portion of the core of Fig. 6 during writing and interrogation operations.
Figure 7B:
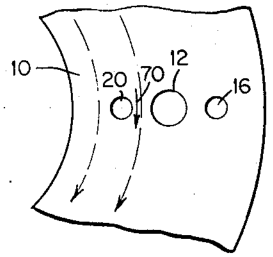
Figure 7C:
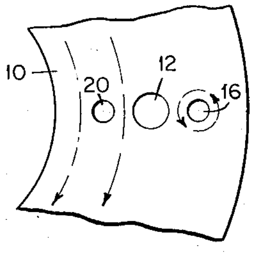
Figure 7D:
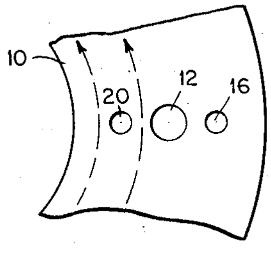
Figure 7E:
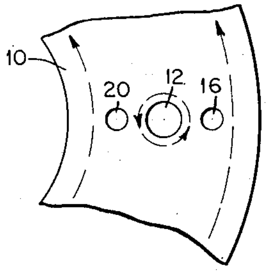
Figure 7F:
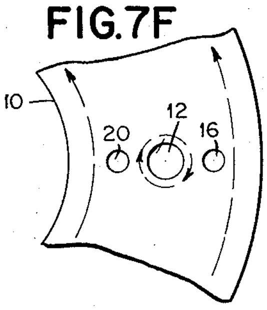

The changes in flux distribution effected during nondestructive interrogation of the core, when in the binary zero representation state, are shown in Figs. 7A, 7B, and 7C and the changes in flux distribution effected during the nondestructive interrogation of the core, when in a binary one representing state, are shown in Figs. 7D, 7E and 7F. After a binary zero has been entered in the core, the flux distribution in the portion of the core embraced by the sense, read and set windings is as shown in Fig. 7A, paths *a* and *b* having been caused to assume a remanent condition of flux density in the direction shown by pulsing winding 62 with a pulse of proper polarity. The core may be then conditioned for subsequent nondestructive interrogation either by pulsing windings 64 and 66 successively or merely by pulsing winding 66 alone. If setup winding 64 is first energized to cause current flow in the direction indicated and thereby apply, as is indicated by an arrow 10 in Fig. 7B, a downward magnetomotive force to the magnetic material in path *b* between apertures 20 and 12, no flux reversal is then effected since the applied magnetomotive force is in the same direction as the remanent flux. The flux distribution therefore, remains the same, as is indicated in Fig. 7B. If the read winding 66 is then energized to apply a downward magnetomotive force to path *c*, in which no flux orientation has been previously effected, a localized condition of saturation is established around opening 16. The condition of flux distribution after energizing winding 66 is shown in Fig. 7C. Thereafter, if setup winding 64 and read winding 66 are successively energized, no output will be developed on winding 68. Each energization of winding 64 causes magnetomotive force to be applied to path *b* in the same direction as the remanent flux and therefore the flux distribution remains as shown in Fig. 7C. A subsequent energization of winding 66 merely drives the localized flux path around opening 16 from remanence to saturation causing only a small flux change in path *c* and only an insignificant output to be induced on winding 68. Once the core has been caused to assume the condition of Fig. 7C, it may be continuously interrogated without destroying the information therein, each interrogation cycle comprising the successive energizations of windings 64 and 66.

The condition of Fig. 7C may also be arrived at by merely pulsing winding 66 after a binary zero has been written in the core. Such a read pulse might be applied to winding 66 following the write pulse during each write cycle or might be applied previous to the beginning of the interrogation operations.

When a binary one has been originally written in the core, the flux pattern is as shown in Fig. 7D. If we consider that, as above-mentioned, each write cycle includes both a pulse applied to write winding 62 and a succeeding pulse applied to winding 66, the flux pattern will be the same as shown in Fig. 7D, with the exception that a localized condition of flux remanence in the counterclockwise direction is established around opening 16. Whether or not a read pulse is applied during the write cycle, the operation is thereafter the same, the flux distribution established during setup and reading being shown in Figs. 7E and 7F. Thereafter, any number of nondestructive read cycles may be undergone, each cycle comprising the application of a pulse first to set up winding 64 and then to read winding 66. The first setup pulse, since it causes magnetomotive force to be applied in a downward direction to the embraced path b, causes the magnetic material around opening 12 to be saturated in the counterclockwise direction and a portion of the main flux to be shifted to path *d*. Upon termination of the setup signal, the core assumes the remanent state of flux distribution shown in Fig. 7E. The application of a pulse to winding 66 then causes a reversal of flux in the path around opening 12 thereby causing an output to be induced in sense winding 68, the core assuming a remanent condition of flux in the directions shown in Fig. 7F, upon termination of the read pulse. Thereafter, each setup pulse applied to winding 64 drives the core from the condition of Fig. 7F to that of 7E and the subsequent application of a read pulse to winding 66 causes the core to again assume the condition of Fig. 7F. This operation involves only the reversing of flux in the localized path around opening 12 and each read pulse applied is effective to cause such a flux reversal which results in an output being induced in winding 68.

Once binary information has been read into core 10 of Fig. 6, and the core conditioned for interrogation, the information bit stored may be read out any number of times nondestructively. The core may at any time be reset by pulsing winding 62 with a pulse of a polarity to establish a remanent condition in the clockwise direction in the main flux path, after which new information may be written by pulsing winding 62 with a pulse of the proper polarity, or, where a binary zero is to be written, merely by failing to pulse this winding. Since the readout of a binary zero causes only a minor flux change in the localized flux path around opening 12 as it is driven from remanence to saturation, the signal to noise ratio is high.

Figure 8:
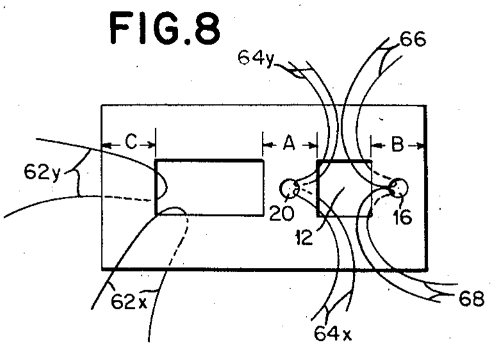
Fig. 8 is a modification of the device of Fig. 6 and illustrates the manner in which half select drive windings may be positioned on a core of this type in a coordinate array system capable of being interrogated nondestructively.

Fig. 8 shows another core configuration usable in magnetic circuits operated in accordance with the principles of the present invention. The windings on this core are adapted for writing and nondestructive interrogation in a coordinate array system. The principles of operation are the same as described with reference to Fig. 6, with the exception that writing is now accomplished under control of two windings **62*x* and 62*y* which are energized with pulses of a magnitude such that it is necessary to energize both windings coincidently to write information in the core. Similarly, the setup winding 64 of Fig. 6 has been replaced by coordinate windings 64*x* and 64*y*, each of which, when energized exclusively, is ineffective to cause a flux reversal but both of which, when energized coincidentally, effect the same changes in flux distribution as are caused by the energization of winding 64** in the embodiment of Fig. 6.

Figure 9:
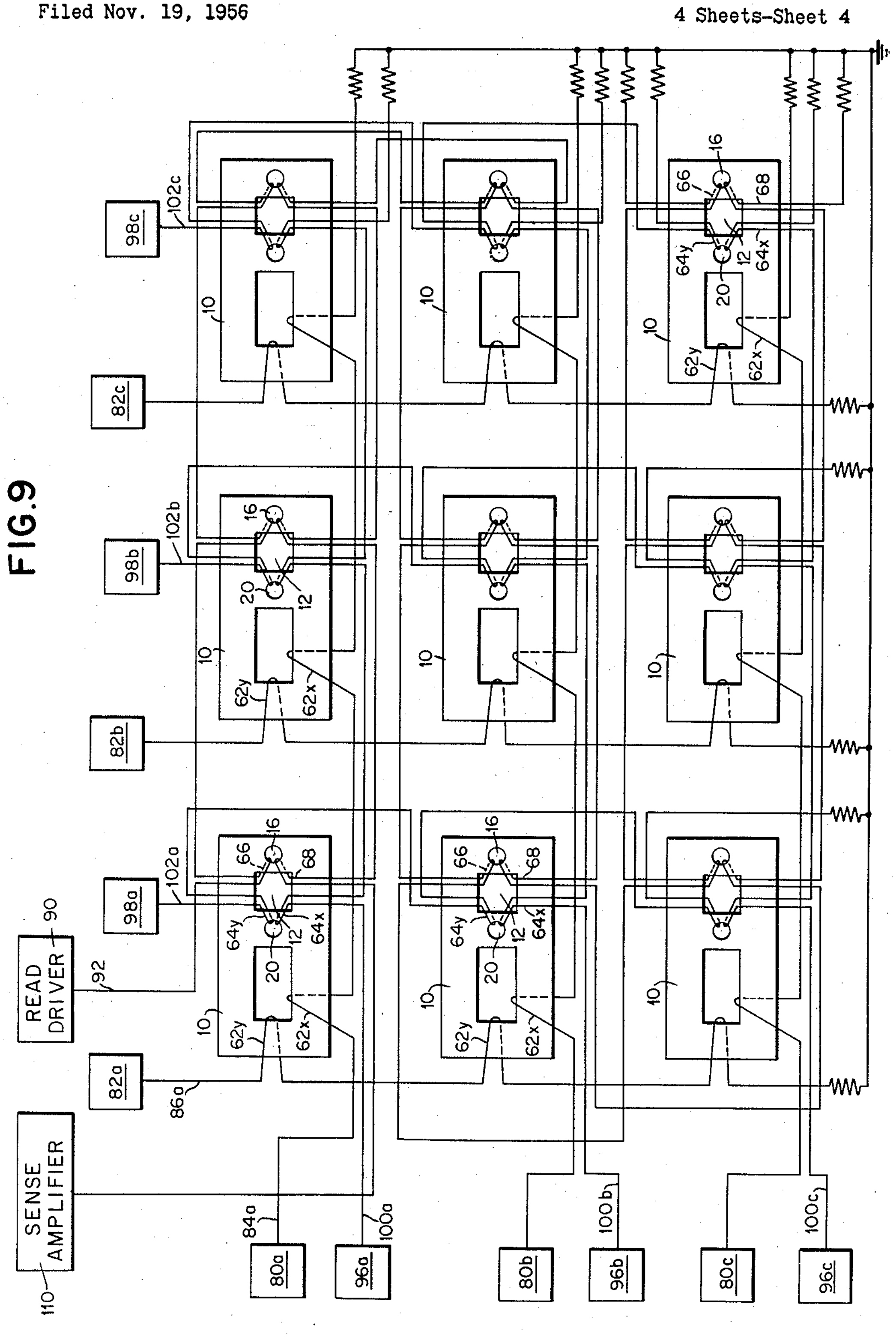
Fig. 9 is a diagrammatic representation of a two dimensional array of magnetic elements of the type shown in Fig. 7.

Fig. 9 shows a two dimensional coordinate array of cores 10 wound in the manner of the embodiment of Fig. 8. Though only a two dimensional array is here shown and described, it is of course obvious that this array might serve as one plane in a three dimensional array wherein the X and Y coordinate lines drive windings on cores in each two-dimensional plane of the array. Input information is applied to the cores in the array of Fig. 9 under the control of three row signal sources **80*a*, 80*b* and 80*c* and three column signal sources 82*a*, 82*b* and 82*c*. These signal sources are controlled by address register circuitry not shown, to apply signals to the coordinate row and column drive lines. For example, a coordinate row drive line 84*a* is connected to row driver 80*a* so that each time this driver is actuated by the address register circuitry, a half select pulse is applied to the input windings 62*x* on each of the cores 10 in the top horizontal row. Similarly, a coordinate drive line 86*a* is connected to column driver 82*a* so that signals, supplied by the driver, are applied to the input windings 62*y* on each of the cores 10 in the left hand column. As was previously explained with reference to Fig. 8, it is necessary that both windings 62*x* and 62*y* on any core 10 be coincidently energized to write information in that core. If we consider that each of the cores is initially at remanence in the clockwise direction, which is the binary zero representing condition, binary zeros may be read into any one of the cores by either coincidently pulsing the proper X and Y drive lines, or failing to pulse these lines, with pulses of the proper polarity. Binary ones may be written by coincidently pulsing the proper X and Y drive lines with pulses of a polarity to cause reversal of flux in the principal core path from a clockwise to a counterclockwise condition. For example, information in the form of a binary one or a binary zero may be written in the core 10 in the upper left-hand corner of the array by coincidently pulsing drive lines 84*a* and 86*a*. Once the required information is read into the cores in the array, the array may be interrogated and, because of the nondestructive feature, interrogation may be repeated as often as desired without destroying the information stored. The cores 10 may be conditioned for interrogation by controlling a signal source 70, which may be termed the read driver, to supply a pulse to a read drive line 92 which drives the read windings 66 on all of the cores in the array. As previously explained, impulsing the read winding causes the flux in the flux paths A and B of cores storing a binary zero, and thus initially in the condition shown in Fig. 7A, to assume a remanent condition as shown in Fig. 7C. In the cores storing a binary one and thus initially in the condition of Fig. 7D, the pulsing of line 92 merely orients the flux in a circular path around opening 16. Once the cores have been thus conditioned, they may be interrogated as described above, each interrogation consisting of a setup and then a read operation. Selection of the core to be interrogated during each interrogation cycle is under control of three row setup drivers 96*a*, 96*b* and 96*c* and three column setup drives 96*a*, 96*b*, and 96*c* which are in turn controlled by address circuitry not shown. The row setup drivers are connected to row setup drive lines 100*a*, 100*b* and 100*c* and the column step drivers are connected to column setup drive lines 102*a*, 102*b* and 102*c*. These setup leads drive the half select setup windings 64*x* and 64*y* on the various cores 10. For example, column setup driver 98*a* drives line 102*a* which is connected to each of the setup windings 64*y* on the cores 10 in the left-hand vertical row of the array and row setup driver 86*a* drives line 100*a* which is connected to each of the setup windings 64*x* on the cores 10 in the top horizontal row of the array. After the selected core is set up by coincidently pulsing the proper setup drive windings, read driver 90 is actuated causing an output indicative of the binary bit stored in the selected core to be developed on the sense winding 68 for that core. The sense windings 68 on all of the cores in the array are connected to a sense amplifier 110** so that, during each interrogation cycle, an output indication of the bit stored in the particular core interrogated is transmitted to this amplifier.

Since it is required that both setup windings on any core be coincidently energized to render the core effective to cause an output to be developed when the subsequent read signal is applied, it is only the core at the intersection of the pulsed setup lines which produces an output in response to the application of the read signal. For example, when, with a binary one stored in all of the cores in the left-hand vertical column, setup windings **96*a* and 98*a* are coincidently energized, only the upper left-hand core in the array will be driven to the condition of Fig. 7E. Thus, only the top core in the column experiences a flux reversal when the read pulse is subsequently applied and it is the output due to this flux reversal which is transmitted to sense amplifier 110. Neither half selected nor fully selected cores are effected by the setup pulses when they are in the binary zero condition, since the magnetomotive force then applied to the core material between openings 20 and 12 is in the same direction as the remanent flux and thus no flux reversal is experienced. These cores, upon termination of the setup signals, reassume their initial flux state which is shown in Fig. 7C. The subsequently applied read pulse merely drives the localized paths around opening 16 in each of these cores from remanence to saturation and cause no appreciable output to be developed in the sense windings 66** on these cores.

Since the selection of the core to be interrogated is made by impulsing the proper setup windings, the signal applied to the read windings 66 may be as large as desired and thus an exceedingly high speed of switching during read-out may be realized. Further, though only a single read line connected to all the read windings is shown in the illustrative embodiment of Fig. 9, several read windings might be used. For example, there might be one read winding for each row of cores. Where such a construction is utilized, the output signal to noise ratio may be improved considerably over that usually attainable in coordinate array systems by pulsing during each readout operation, only the read line for the row which contains the core to be interrogated.

After completion of the first interrogation operation, the same core may be repeatedly interrogated by first coincidently pulsing drive lines **100*a* and 102*a* and then pulsing read drive line 92. In a similar manner any of the other cores in the array may be interrogated as often as desired following the same sequence of operation. In each operation, the core to be interrogated is first selected by pulsing the proper coordinate setup drive lines. The selected core is then read by pulsing the read drive line 92**.

It should be noted that, in the above-described mode of operation, the application of the setup signals during an interrogation cycle to a selected core in the binary one condition causes a flux reversal in the localized path around opening 12. This flux reversal causes an output, of a polarity opposite to that produced upon the subsequent application of a read pulse, to be transmitted to sense amplifier 110. Since a flux reversal is accomplished around this opening with a core in the binary one condition both upon the coincident energization of the setup windings and the energization of the read windings, and since no flux reversal is ever effected in a core in the binary zero condition by the setup signals, the output of the array may be taken at the time the setup windings are energized. Where this mode of operation is utilized it is not necessary to initially condition the cores for interrogation, but interrogation operations may be begun immediately after the information is written in the cores in the array. Each interrogation is again a two-cycle operation involving alternate energization of the read and proper setup drive lines and, according to the mode practiced, polarity sensitive or gating circuitry may be utilized in conjunction with the same amplifier circuitry to transmit only one of the output pulses produced when a core in the binary one representing condition is interrogated.

It should also be noted that, in each of the embodiments shown, binary information may be represented by the presence or absence of the main flux in one particular path or by the direction of flux in a particular path. For example, all of the flux changes, depicted in Figs. 7A, 7B, 7C, 7D, 7E and 7F, which are utilized in producing the desired outputs are experienced in paths *b*, *c* and *d* and the direction of flux in path *b* alone, after writing by windings 62, is indicative of the information stored in the core.

It should be further noted that, in operating the core structures of the present invention, flux is never switched at any one time in a flux path which encompasses more than two of the openings in the core. For this reason the actual flux paths switched during any single operation are not required, by the geometry of the structure, to be of such great length as to appreciably lessen the switching speeds.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a magnetic circuit, a core of magnetic material capable of being caused to assume different remanent conditions of flux orientation, said core having a first portion and a second portion, the cross portion of magnetic material in said first portion being greater than twice as large as the cross section of magnetic material in said second portion, said first portion of said core having first, second and third openings positioned therethrough dividing said core into four parallel flux paths, a first winding positioned through said first and second openings only, a second winding positioned through said second and third openings only; first and second signal means coupled to said first and second windings, respectively, for applying energizing signals thereto; and an output winding inductively associated with at least a portion of the magnetic material in said second portion of said core.

2. In a magnetic circuit, a core of magnetic material capable of being caused to assume different remanent conditions of flux orientation, said core having first, second and third openings therethrough dividing a portion of said core into first, second, third and fourth parallel flux paths, a first winding positioned through said first and second openings only to embrace only said second flux path, a second winding positioned through said second and third openings only to embrace only said third flux path, means coupled to said first and second windings for applying energizing signals thereto, and output winding embracing at least one of said third and fourth flux paths.

3. In a magnetic circuit, a core of magnetic material capable of being caused to assume different remanent conditions of flux orientation, said core defining a closed main flux path, the cross section of magnetic material in a first portion of said core being greater than twice as large as the cross section of magnetic material in a second portion of said core, said first portion of said core having first, second and third openings therethrough dividing said first portion into first, second, third and fourth flux paths of substantially equal cross section, said first flux path being bounded by the inner periphery of said main flux path and said first opening, said second flux path being bounded by said first and second openings, said third flux path being bounded by said second and third openings, said fourth flux path being bounded by said third opening and the outer periphery of said main flux path, a first input winding embracing magnetic material in said second portion of said core, a second input winding embracing said second flux path only, a third input winding embracing said third flux path only, and an output winding embracing at least one of said third and fourth flux paths.

4. A magnetic core memory device comprising a closed magnetic circuit capable of being caused to assume different remanent flux conditions, said circuit having a portion thereof divided into first, second, third and fourth parallel flux paths, means for establishing a condition of remanent flux in at least a portion of said closed magnetic circuit including said first and second flux paths, input winding means embracing said second flux path only and effective when energized with a first signal to increase the reluctance of said second path only to said remanent flux and thereby cause said remanent flux to traverse said first and one of said third and fourth paths instead of said first and second paths, and an output winding embracing at least one of said third and fourth flux paths.

5. A magnetic circuit device comprising a core of magnetic material capable of being caused to assume stable conditions of flux remanence, said core defining a main flux path, said main flux path comprising in a first portion of said core first, second, third and fourth parallel flux paths, means for establishing a condition of unidirectional flux remanence in said main flux path wherein the remanent flux traverses said first and second flux paths in said first portion of said core; first winding means inductively associated with said second flux path effective, when caused to apply magnetomotive force in a first direction to said second path, to cause said remanent flux in said main path to traverse said first and fourth paths instead of said first and second paths; said first winding means being effective, when subsequently caused to apply magnetomotive force in an opposite direction to said second flux path, to cause said remanent flux in said main path to traverse said third and fourth flux paths instead of said first and fourth paths; means coupled to said first winding means for causing said winding means to apply magnetomotive forces in each of said directions to said second flux path, second winding means for causing said remanent flux in said main flux path to again traverse said first and second flux paths, and output winding means for sensing flux changes in at least one of said four parallel flux paths.

6. In a magnetic memory device, a core of magnetic material having first, second and third openings positioned through a portion thereof dividing said portion into first, second, third and fourth parallel flux paths, said core being capable of being caused to assume a first remanent condition with flux oriented in a first direction in a closed path extending around said core and including said first and second flux paths and a second remanent condition with flux oriented in said first direction in a closed flux path extending around said core and including said third and fourth flux paths, first and second winding means normally applying bias magnetomotive forces in a first direction to said second and third flux paths, respectively, pulse means coupled to said first winding means for rendering said first winding means effective to apply magnetomotive force to said second flux path in a direction opposite said first direction, signal means coupled to said second winding means for rendering said second winding means effective to apply magnetomotive force to said third flux path in a direction opposite said first direction, and output winding means inductively associated with at least one of said parallel flux paths.

7. In a magnetic memory device, a core of magnetic material having first, second and third openings positioned through a portion thereof dividing said portion into first, second, third and fourth parallel flux paths, said core being capable of being caused to assume a first remanent condition with flux oriented in a first direction in a closed path extending around said core and including said first and second flux paths and a second remanent condition with flux oriented in said first direction in a closed flux path extending around said core and including said third and fourth flux paths, first and second bias windings applying magnetomotive force in said first direction to said second and third flux paths, respectively; means for controlling said core when in said first remanent condition to assume said second remanent condition comprising a winding means embracing said second flux path and effective when energized to overcome said bias magnetomotive force applied by said first bias winding and cause a net magnetomotive force in a direction opposite said first direction to be applied to said second flux path; means for controlling said core when in said second remanent condition to assume said first remanent condition comprising a further winding means effective when energized to overcome said bias magnetomotive force applied by said second bias winding and cause a net magnetomotive force in a direction opposite said first direction to be applied to said third flux path; and sense winding means inductively associated with at least one of said flux paths.

8. The invention as claimed in claim 7 wherein said first flux path is shorter than said second flux path, said second flux path is shorter than said third flux path, and said third flux path is shorter than said fourth flux path.

9. The invention as claimed in claim 8 wherein said winding means embracing said second flux path comprises first and second half select windings each of which when energized is of itself insufficient to control said core when in said first remanent condition to assume said second remanent condition but both of which when energized coincidently are effective to control said core when in said first remanent condition to assume said second remanent condition.

10. A magnetic memory device comprising a core of magnetic material having first, second and third openings positioned through a portion thereof dividing said portion into first, second, third and fourth parallel flux paths, said core being capable of being caused to assume a first remanent condition with flux oriented in a first direction in a closed flux path extending around said core and including said first and second flux paths and a second remanent condition with flux oriented in said first direction in a closed flux path around said core and including said third and fourth flux paths, first and second bias windings embracing said second and third flux paths respectively, a first pair of half select drive windings each embracing said second flux path, a second pair of half select drive windings each embracing said third flux path, and a sense winding embracing at least one of said parallel flux paths.

11. A magnetic memory device comprising a core of magnetic material having a portion thereof divided into a plurality of parallel flux paths, said core being capable of being caused to assume a first remanent condition with flux oriented in a first direction in a closed flux path extending around said core and including a first one of said plurality of parallel flux paths and a second remanent condition with flux oriented in said first direction on a closed flux path extending around said core and including a second one of said plurality of flux paths, bias means adjacent said first and second parallel flux paths, respectively, for applying magnetomotive force in said first direction to at least a portion of each path, first and second input winding means inductively associated with said first and second parallel paths, respectively, each for applying magnetomotive force in a direction opposite said first direction to at least a portion of the associated path, and sense winding means embracing at least a portion of one of said parallel flux paths.

12. In a magnetic memory device, a core of magnetic material having a portion thereof divided into first, second, third and fourth parallel flux paths, said core being capable of being caused to assume a first remanent condition with flux oriented in a first direction in a closed flux path extending around said core and including said first and second flux paths and a second remanent condition with flux oriented in an opposite direction in a closed flux path extending around said core and including said first and fourth flux paths; means for nondestructively interrogating the condition of said core comprising first winding means embracing said second flux path effective when energized to apply magnetomotive force in said first direction to said second flux path, a second winding means embracing said third flux path effective when energized to apply magnetomotive force in said first direction to said third flux path, and a sense winding embracing at least one of said parallel flux paths.

13. The invention as claimed in claim 12 wherein said first winding means comprises first and second individual half select windings.

14. In a magnetic memory device, a core of magnetic material having a first portion thereof divided into a plurality of parallel flux paths, said core being capable of being caused to assume a first remanent condition with flux oriented in one direcion in a closed flux path extending around said core and including a first one of said plurality of parallel flux paths and with flux oriented in a first local closed flux path extending within said first portion of said core and including portions of two of said plurality of parallel flux paths other than said first one of said parallel flux paths, said core being capable of being caused to assume a second remanent condition with flux oriented in a closed flux path extending around said core and including a second one of said plurality of parallel flux paths and with flux oriented in a second local closed flux path extending within said first portion of said core and including portions of two of said plurality of flux paths other than said second one of said parallel flux paths; means for nondestructively interrogating said core comprising first and second winding means each embracing a different one of said plurality of parallel flux paths and effective when alternately energized when said core is in said first remanent condition to alternately reverse the flux in said first local flux path, said first and second winding means being ineffective when said core is in said second remanent condition to reverse the flux in any of said flux paths, and a sense winding inductively associated with said first local flux path.

15. A binary storage device comprising a magnetic core having first and second portions, said first portion being divided into a plurality of parallel flux paths, said core being capable of being caused to assume a first remanent condition with flux oriented in a first direction in a closed flux path extending around said core and including one of said plurality of parallel flux paths and a second remanent condition with flux oriented in a second direction in a closed flux path extending around said core and including one of said plurality of parallel flux paths, input winding means embracing said second portion of said core for selectively causing said core to assume said first and second remanent conditions; means for nondestructively interrogating the state of said core comprising first and second winding means each embracing only one of said plurality of parallel flux paths and each effective when energized to apply magnetomotive force in said first direction to said embraced path, and sense winding means inductively associated with at least one of said plurality of flux paths.

16. In a magnetic memory device, a core of magnetic material having first and second portions, said first portion being divided into at least first and second parallel flux paths, first winding means embracing magnetic material in said second portion of said core for selectively establishing first and second remanent conditions of flux orientation in first and second directions in a closed flux path extending around said core and including magnetic material in each of said first and second portions; and means for interrogating the condition of said core comprising a second winding means embracing only magnetic material in said first parallel flux path in said first portion of said core, said second winding means being arranged so that when energized it applies magnetomotive force in the same direction to all of the magnetic material it embraces, a third winding means embracing only magnetic material in said second parallel flux path in said first portion of said core, said third winding means being arranged so that when energized it applies magnetomotive force in the same direction to all of the magnetic material which it embraces, first pulse means coupled to said second winding means for applying thereto a pulse effective to cause magnetomotive force in said first direction to be applied to the magnetic material embraced by said second winding means, second pulse means coupled to said third winding means for applying thereto a pulse effective to cause magnetomotive force in said first direction to be applied to the magnetic material embraced by said third winding means, and sense winding means inductively associated with said first portion of said core.

17. A binary storage device comprising a magnetic core having a first portion thereof divided into at least first, second and third parallel flux paths, said core being capable of being caused to assume a first remanent condition with flux oriented in one direction in a closed flux path extending around said core and including said first parallel flux path and a second remanent condition with flux oriented in one direction in a closed flux path extending around said core and including said first flux path, first and second winding means for applying magnetomotive force to said core, said first winding means embracing magnetic material in said first flux path only and wound so that when energized it is effective to apply magnetomotive force in the same direction to all of the magnetic material it embraces, said second winding means embracing magnetic material in one of said second and third flux paths and wound so that when energized it is effective to apply magnetomotive force in the same direction to all of the magnetic material it embraces, and sense winding means inductively associated with at least one of said first, second and third flux paths.

18. The invention as claimed in claim 17 wherein said first winding means comprises first and second individual half select windings.

19. The invention as claimed in claim 17 wherein said first winding means includes a bias winding wound in a first sense and a further winding wound in a sense opposite said first sense.

20. In a magnetic memory array, a plurality of binary storage cores connected in coordinate rows and columns, each said storage core having a first and second portion, said second portion of each core being divided into at least first, second and third parallel flux paths, each of said cores being capable of being caused to assume a first remanent condition with flux oriented in a first direction in a closed flux path extending around said core and including said first flux path and a second condition of flux remanence with flux oriented in an opposite direction in a closed flux path extending around said core and including said first flux path, coordinate half select write windings embracing said first portion of said cores for selectively causing said cores to assume said first and second remanent conditions; a plurality of pairs of coordinate half select setup drive windings, each pair embracing only said first flux path of an associated one of said cores, for coincidently applying magnetomotive force in said first direction to said embraced path; a plurality of series connected read windings, each embracing said second flux path only of an associated one of said cores, for applying magnetomotive force in said second direction to said embraced path, and a sense winding embracing at least one of said first, second and third flux paths of each of said cores.

References Cited in the file of this patent

"The Transfluxor" (Rajchman), Proceedings of the IRE, vol. 44, issue 3, pp. 321–322, March 1956. (Copy in Div. 42.)

UNITED STATES PATENT OFFICE

CERTIFICATION OF CORRECTION

Patent No. 2,898,581 August 4, 1959

Frederick L. Post

It is hereby certified that error appears in the above numbered patent requiring correction and that the said Letters Patent should read as corrected below.

Column 16, line 18, for "first", first occurrence, read -- third --.

Signed and sealed this 9th day of May 1961.

(SEAL)
Attest:

ERNEST W. SWIDER
Attesting Officer

DAVID L. LADD
Commissioner of Patents